(12) United States Patent
London et al.

(10) Patent No.: US 8,112,887 B2
(45) Date of Patent: Feb. 14, 2012

(54) TWO-PIECE SHIPPING CAP FOR A SEAL

(75) Inventors: John A. London, Cornelia, GA (US); Patrick Scheib, Cornelia, GA (US); Peter C. Whitaker, Gainesville, GA (US); Damian J. Feltner, Demorest, GA (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 0 days.

(21) Appl. No.: 13/018,914

(22) Filed: Feb. 1, 2011

(65) Prior Publication Data
US 2011/0119895 A1 May 26, 2011

Related U.S. Application Data

(62) Division of application No. 12/129,750, filed on May 30, 2008, now Pat. No. 8,028,852.

(51) Int. Cl.
*B21D 53/84* (2006.01)
(52) U.S. Cl. ............... 29/888.3; 29/235; 277/551
(58) Field of Classification Search ............ 29/235, 29/428, 888.3; 227/551, 549; 220/378
See application file for complete search history.

(56) References Cited

U.S. PATENT DOCUMENTS

| 2,405,120 | A | * | 8/1946 | Evans | 29/271 |
| 2,807,079 | A | * | 9/1957 | Josephson | 29/235 |
| 3,866,813 | A | * | 2/1975 | Arnold | 277/551 |
| 4,470,185 | A | * | 9/1984 | Weber | 29/235 |
| 4,625,977 | A | * | 12/1986 | Azibert et al. | 277/361 |
| 5,013,050 | A | | 5/1991 | Curtis et al. | |
| 5,052,695 | A | | 10/1991 | Curtis | |
| 5,174,006 | A | | 12/1992 | Ellis | |
| 6,370,751 | B1 | | 4/2002 | Rullmann et al. | |
| 6,533,586 | B2 | * | 3/2003 | Marketkar et al. | 439/38 |
| 7,047,619 | B2 | | 5/2006 | Wambold et al. | |
| 7,055,828 | B2 | | 6/2006 | Hatch et al. | |
| 7,059,608 | B2 | * | 6/2006 | Ramsay | 277/551 |
| 7,096,551 | B2 | | 8/2006 | Lackowski, II | |
| 2003/0173746 | A1 | * | 9/2003 | Ramsay | 277/549 |

FOREIGN PATENT DOCUMENTS
WO 2007/061991 5/2007

* cited by examiner

*Primary Examiner* — David Bryant
*Assistant Examiner* — Jacob Cigna
(74) *Attorney, Agent, or Firm* — Dan Sepanik, Esq.; Harness, Dickey & Pierce, P.L.C.

(57) ABSTRACT

A seal shipping system includes a seal having an outer diameter surface and an inner sealing lip. A sleeve member having a cylindrical body and a radially extending flange extending from the cylindrical body engages the inner sealing lip. An annular collar surrounds the radially extending flange of the sleeve member and frictionally engages the outer diameter surface of the seal.

9 Claims, 2 Drawing Sheets

US 8,112,887 B2

TWO-PIECE SHIPPING CAP FOR A SEAL

CROSS-REFERENCE TO RELATED APPLICATIONS

This application is a divisional of U.S. patent application Ser. No. 12/129,750, filed on May 30, 2008 now U.S. Pat. No. 8,028,852, the entire disclosure of which is incorporated herein by reference.

FIELD

The present disclosure relates to seals and more particularly, to a shipping system for a seal and a seal assembly method.

BACKGROUND

The statements in this section merely provide background information related to the present disclosure and may not constitute prior art.

Assembly/Shipping aids are common for sprung lip or PTFE radial shaft seals. These aids are typically one-piece and are retained by the seal's inside diameter sealing element because it has sufficient radial force to retain the aid. To improve fuel efficiency in automobiles, new seal designs have been developed to provide shaft sealing with a sealing element having a reduced radial load (e.g., "Energy Saving Seal" or "ESS"). If an assembly/shipping aid were required on an Energy Saving Seal, the low radial load provided by the ID sealing element would be insufficient to retain the assembly/shipping aid. For this reason, a new method of attachment to this type of seal is required. The attachment method is further complicated if the seal is shipped from the seal manufacturer, assembled into a subassembly, and then delivered to the final customer.

SUMMARY

A seal shipping system includes a seal having an outer diameter surface and an inner sealing lip. A sleeve member having a cylindrical body and a radially extending flange extending from the cylindrical body engages the inner sealing lip. An annular collar surrounds the radially extending flange of the sleeve member and frictionally engages the outer diameter surface of the seal for retaining the sleeve member in the seal.

A method of installing a seal having an outer diameter surface and an inner sealing lip includes inserting a sleeve member into the seal, the sleeve member having a cylindrical body and a radially extending flange extending from the cylindrical body such that the cylindrical body is received inside of the inner sealing lip and the radially extending flange abuts against an end of the seal. An annular collar is attached to the sleeve member and the seal wherein the collar is pressed onto the outer diameter surface of the seal for retaining the sleeve member to the seal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
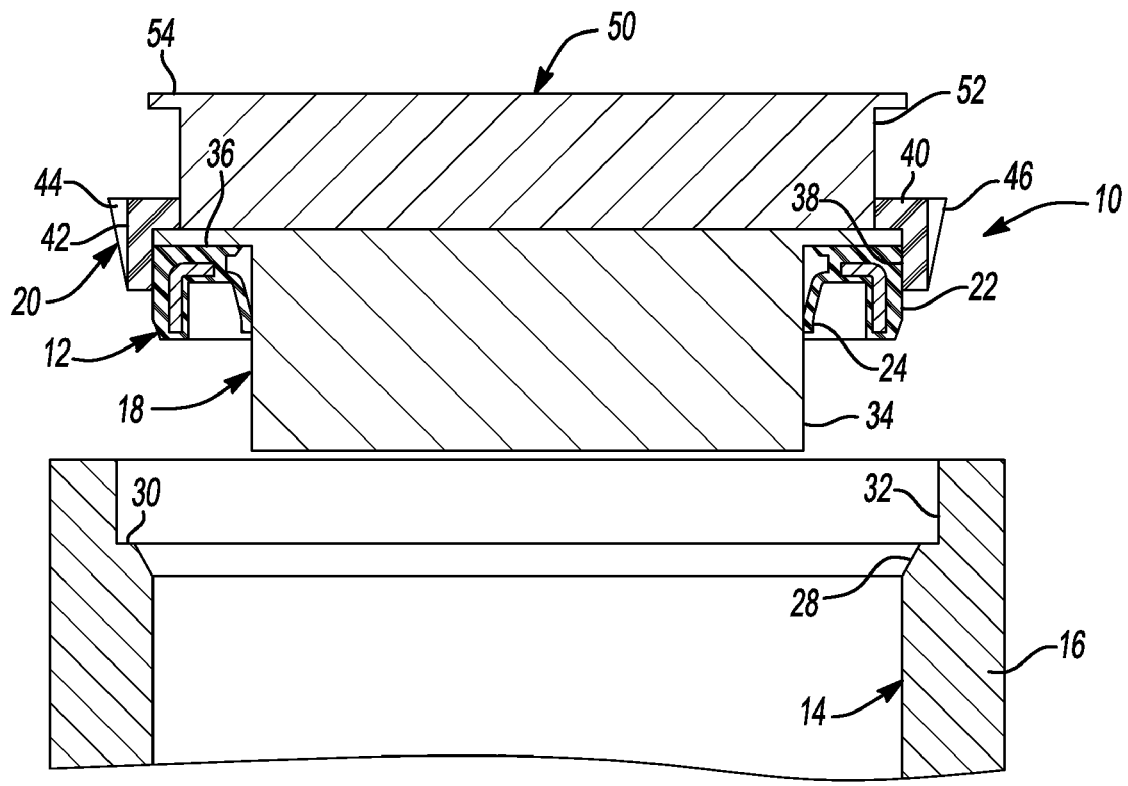
FIG. 1 is a cross-sectional view illustrating a seal shipping system prior to installation in a housing.
Figure 2:
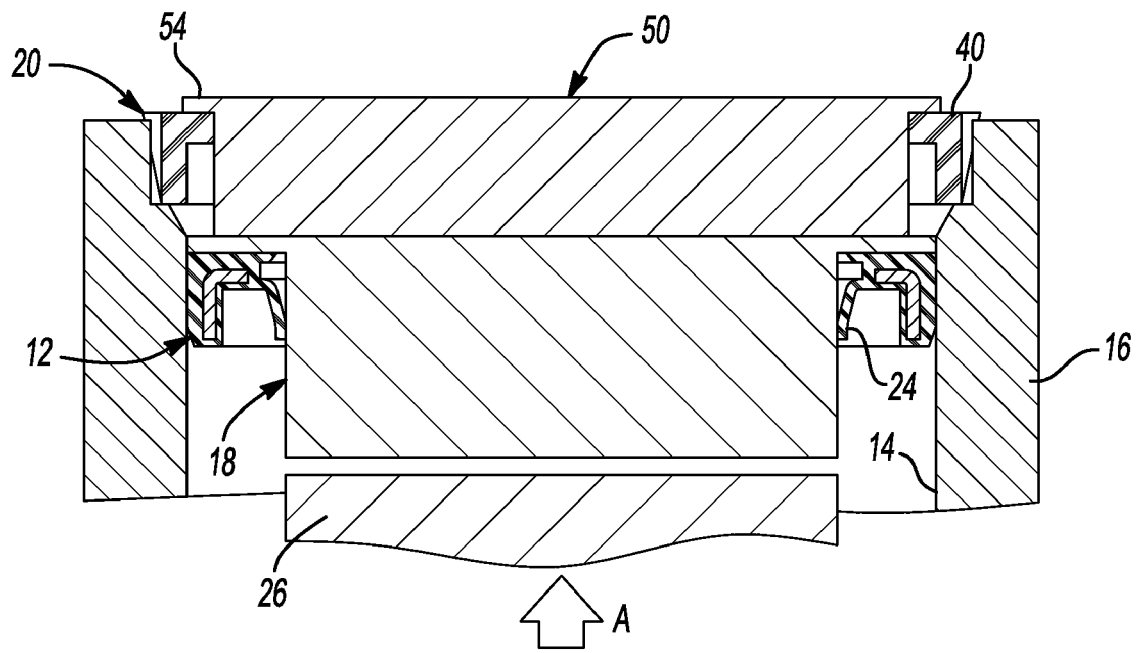
FIG. 2 is a cross-sectional view illustrating a seal shipping system installed in a housing.
Figure 3:
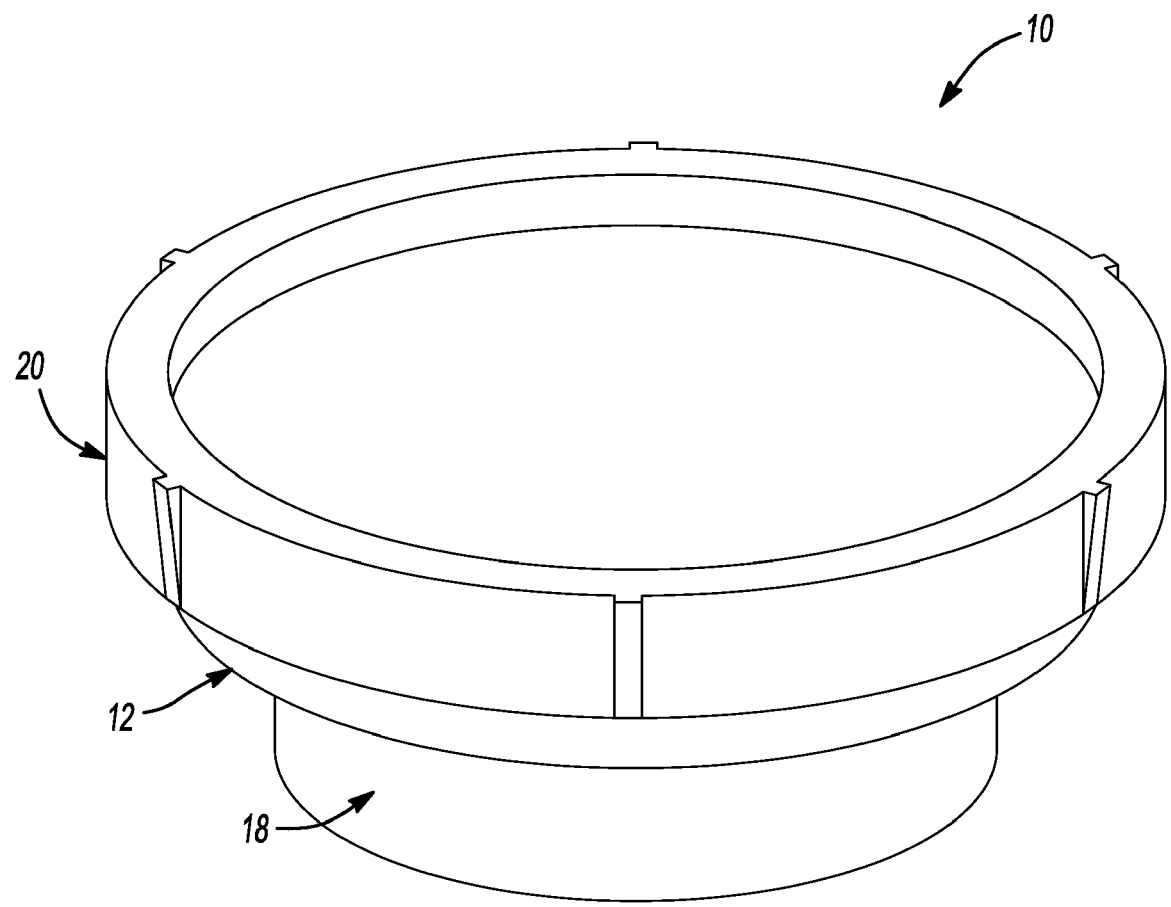
FIG. 3 is a perspective view of a seal shipping assembly according to the principles of the present disclosure.

With reference to FIGS. 1-3, a seal shipping system 10, according to the principles of the present disclosure, will now be described. The seal shipping system 10 includes a seal 12 that is designed to be inserted into a bore 14 of a housing 16. A two-piece shipping cap is provided including a sleeve 18 that is received within the seal 12 and a collar 20 which retains the sleeve 18 inside the seal 12.

The seal 12 can include an outer diameter surface 22 designed to be press fit within the bore 14 of the housing 16. An inner seal lip 24 extends radially inward and is designed to engage a rotating or reciprocating shaft 26, shown in FIG. 2. The seal 12 can be of the energy saving seal type, or can be of other types as known in the art.

The housing 16 defines the bore 14 which receives the seal 12. A tapered section 28 can be disposed adjacent to the bore 14 to facilitate the insertion of the seal 12 into the bore 14. A shoulder portion 30 can be disposed adjacent to the tapered portion 28 and an inner diameter collar receiving portion 32 can be disposed adjacent to the shoulder 30 for receiving the collar 20 of the two-piece shipping cap therein. The housing 16 can be an engine component, a transmission component, or another housing which is designed to receive a shaft in a bore.

The sleeve member 18 of the two-piece shipping cap includes a cylindrical body portion 34 that is received inside of the seal 12 so as to contact the inner seal lip 24. A radially extending flange 36 extends radially outward from the cylindrical body 34 and is abutted against an end face of the seal 12.

The collar 20 of the two-piece shipping cap includes an inner diameter portion 38 and a radially inwardly extending flange 40 extending radially inward from the inner diameter portion 38. The inner diameter portion 38 receives the radially extending flange 36 therein and is designed to be press fit over at least a portion of the outer diameter surface 22 of the seal 12, with the radially inwardly extending flange 40 abutting against the radially extending flange 36 of sleeve member 18 so as to secure the sleeve member 18 within the seal 12. An outer surface 42 of the collar 20 can be provided with a plurality of radially extending projections 44 that can have a tapered outer surface 46 to facilitate the insertion of the collar 20 into the collar receiving portion 32 of housing 16, as will be described in greater detail herein.

With reference to FIG. 1, the assembly of the two-piece shipping cap on the seal 12 will now be described. Once the seal 12 is fully processed and ready for packaging, the cylindrical body portion 34 of the sleeve member 18 is inserted into the seal 12. To protect the inner diameter sealing surface, the outer diameter of the cylindrical body portion 34 of the sleeve member 18 is smaller than the outer diameter of the application's shaft 26 that the seal's inner seal lip 24 will contact the sleeve 18. The collar 20 is then pressed onto the outer diameter surface 22 of the seal 12. In order to protect the outer diameter sealing surface, the collar 20 can be designed so as not to contact the entire axial width of the seal outer diameter surface 22. The collar 20 is pressed onto the seal 12 such that the radially extending flange 36 of the sleeve member 18 is retained between the collar 20 and seal 12. In this condition, the seal inner diameter is protected from contamination.

The seal 12, along with the two-piece shipping cap (sleeve member 18 and collar 20) can then be shipped to a subassembly location. At the subassembly location, the seal 12 and the two-piece shipping cap can be assembled into the housing 16 utilizing an assembly tool 50. The assembly tool 50 can include a cylindrical body portion 52 that has an outer diameter smaller than the inner diameter of the radially inwardly extending flange 40 of the collar 20. It should be understood that the cylindrical body portion 52 can have many other shapes, so long as it can be received within the radially inwardly extending flange 40 of the collar 20.

The assembly tool 50 includes a stop flange 54 extending radially from the body portion 52.

Using the assembly tool 50, the seal 12 and two-piece shipping cap 18, 20 are pushed toward the bore 14 in the housing 16. The collar 20 comes into contact with the housing 16 and the tapered outer surface 46 of projections 44 facilitate alignment of the seal 12 with the bore 14. Depending on the application, the collar 20 can be designed to mate on an inner diameter or an outer diameter of the mating housing 16. In the embodiment as shown, the collar 20 mates on the inner diameter collar receiving portion 32 of the housing 16. The radially extending projections 44 provide an interference with the inner diameter collar receiving portion 32. As the assembly tool 50 is pressed further, the seal 12 and sleeve 18 are permitted to move axially relative to the fixed collar 20 until the stop flange 54 of the assembly tool 50 engages an end surface of the collar 20, as illustrated in FIG. 2, at which point, the seal is received in its desired axial position in the bore 14, as shown in FIG. 2. In this condition, the inner seal lip 24 of the seal 12 is still protected from contamination.

As noted previously, the housing 16 can be an engine component, a transmission component, or another component of an industrial machine or device that is designed to include a bore for receiving a shaft therein. The housing 16 with the seal 12 assembled therein, along with the two-piece shipping cap 18, 20 then forms a subassembly that can be shipped to a final customer for final assembly, while the seal is protected by the two-piece cap 18, 20 from contamination and/or damage. The housing 16 that forms a portion of the subassembly can be bolted onto an engine or other final assembly. Then a shaft 26, such as a crankshaft, can be fed towards the subassembly, as illustrated by arrow A in FIG. 2. As the shaft 26 contacts the sleeve 18, the sleeve 18 begins to move axially relative to the seal 12 and the shaft 26 pushes the sleeve 18 into contact with the collar 20. The sleeve 18 and collar 20 are then pressed out simultaneously and can be received in a recycling bin. The shaft 26 can then be secured to the assembly, completing the assembly process. According to one potential embodiment, a second shaft can be attached to shaft 26.

It should be understood that the two-piece shipping cap 18, 20 can be retained in the housing 16 by additional components, such as bolts or other fasteners as a temporary means of retaining the two-piece shipping cap in the subassembly. Furthermore, the sleeve 18 could be provided with a "pull ring" that an operator could pull to manually remove the sleeve and collar 20 simultaneously. Furthermore, the sleeve and collar could be removed separately prior to the installation of the shaft 26.

The sleeve member 18 and collar 20 can be made of a variety of materials including polypropylene and ABS, or other suitable materials, and preferably is made of a material that is recyclable. It is also anticipated that the sleeve member 18 and collar 20 could be re-used, if desired.

What is claimed is:

1. A method of installing a seal having an outer diameter surface and an inner sealing lip, comprising:
    inserting a sleeve member into said seal, said sleeve member having a cylindrical body and a radially extending flange extending from said cylindrical body such that said cylindrical body is received inside of said inner sealing lip and said radially extending flange abuts against an end of said seal;
    attaching an annular collar to said sleeve member and said seal wherein said collar is pressed onto said outer diameter surface of said seal for retaining said sleeve member to said seal;
    assembling the seal in a housing including aligning the seal with a bore in a housing and pressing the sleeve toward said bore while said collar mates with said housing and continuing to press the sleeve such that said sleeve and said seal move axially relative to said collar until said seal is pressed to its desired axial position within said bore; and
    inserting a shaft into said seal by pressing said shaft against said sleeve until the sleeve moves relative to seal and presses against said collar and the sleeve and collar are pressed out of engagement with said seal and said housing, respectively.

2. The method according to claim 1, further comprising shipping the seal with the sleeve and collar mounted thereon to an assembly location prior to said step of assembling said seal in a housing.

3. The method according to claim 1, further comprising shipping the seal with the sleeve, collar and housing to a final assembly location prior to said step of inserting a shaft into said seal.

4. The method according to claim 1, wherein said shaft is a crankshaft.

5. The method according to claim 1, wherein said housing is an engine component.

6. The method according to claim 1, wherein said collar is made from an elastomeric material.

7. The method according to claim 1, wherein said collar includes a plurality of radially extending projections for mating with said housing, said plurality of radially extending projections have a tapered outer surface.

8. The method according to claim 1, wherein said collar includes a radially inwardly extending flange abutting against said radially extending flange of said sleeve member.

9. The method according to claim 1, wherein said housing includes a shoulder portion for engaging said collar.

* * * * *